(12) United States Patent
Campbell et al.

(10) Patent No.: US 11,823,365 B2
(45) Date of Patent: Nov. 21, 2023

(54) AUTOMATIC IMAGE BASED OBJECT DAMAGE ASSESSMENT

(71) Applicant: Emergent Network Intelligence Ltd, Tyne and Wear (GB)

(72) Inventors: Christopher Campbell, Tyne and Wear (GB); Karl Hewitson, Tyne and Wear (GB); Karl Brown, Tyne and Wear (GB); Jon Wilson, Durham (GB); Sam Warren, Salt Lake City, UT (US)

(73) Assignee: Emergent Network Intelligence Ltd., Tyne and Wear (GB)

( * ) Notice: Subject to any disclaimer, the term of this patent is extended or adjusted under 35 U.S.C. 154(b) by 0 days.

(21) Appl. No.: 16/335,674

(22) PCT Filed: Sep. 15, 2017

(86) PCT No.: PCT/GB2017/052729
§ 371 (c)(1),
(2) Date: Mar. 21, 2019

(87) PCT Pub. No.: WO2018/055340
PCT Pub. Date: Mar. 29, 2018

(65) Prior Publication Data
US 2020/0034958 A1  Jan. 30, 2020

(30) Foreign Application Priority Data
Sep. 21, 2016  (GB) ..................................... 1616078

(51) Int. Cl.
*G06T 7/00* (2017.01)
*G06Q 10/10* (2023.01)
(Continued)

(52) U.S. Cl.
CPC ........... *G06T 7/0002* (2013.01); *G06N 3/045* (2023.01); *G06Q 10/10* (2013.01); *G06Q 40/08* (2013.01);
(Continued)

(58) Field of Classification Search
CPC . G06Q 40/08; G06F 16/51; A61B 2560/0242; A61B 5/05; A61B 5/1113;
(Continued)

(56) References Cited

U.S. PATENT DOCUMENTS

| 8,095,391 B2 | 1/2012 | Obora et al. |
| 8,244,025 B2 * | 8/2012 | Davis ...................... G06T 19/00 382/154 |

(Continued)

FOREIGN PATENT DOCUMENTS

| CN | 105405054 A | 3/2016 |
| EP | 3065085 A1 | 9/2016 |
| WO | 2012/113084 A1 | 8/2012 |

OTHER PUBLICATIONS

International Search Report of the International Searching Authority dated Nov. 10, 2017, issued in connection with International Application No. PCT/GB2017/052729 (3 pages).
(Continued)

*Primary Examiner* — Santiago Garcia
(74) *Attorney, Agent, or Firm* — McCarter & English, LLP (57) ABSTRACT

The present invention provides a computer-based method for automatically evaluating validity and extent of at least one damaged object from image data, comprising the steps of: (a) receive image data comprising one or more images of at least one damaged object; (b) inspect any one of said one or more images for existing image alteration utilising an image alteration detection algorithm, and remove any image
(Continued)

comprising image alterations from said one or more images; (c) identify and classify said at least one damaged object in any one of said one or more images, utilising at least one first machine learning algorithm; (d) detect at least one damaged area of said classified damaged object, utilising at least one second machine learning algorithm; (e) classify, quantitatively and/or qualitatively, an extent of damage of said at least one damaged area, utilising at least one third machine learning algorithm, and characteristic information of said damaged object and/or an undamaged object that is at least equivalent to said at least one damaged object; (f) provide a visual marker to said detected at least one damaged area in any one of said at least one or more images; (g) generate a predictive analysis to repair and/or replace said at least one damaged object, utilising a fourth machine learning algorithm and said classified extent of damage of the detected said at least one damaged area.

12 Claims, 6 Drawing Sheets

(51) Int. Cl.
  *G06Q 40/08* (2012.01)
  *G06N 3/045* (2023.01)
(52) U.S. Cl.
  CPC .............. *G06T 2207/20081* (2013.01); *G06T 2207/20084* (2013.01); *G06T 2207/30252* (2013.01)
(58) Field of Classification Search
  CPC .... A61B 5/1128; A61B 5/0452; B25J 19/023; G05D 1/0246; G05D 1/0272; G05D 1/0274; G06K 9/00335; G06K 9/00664; G06K 9/00; G06K 2209/19; G06T 7/248; G06T 19/00; G06T 2200/24; G06T 2219/028; G06T 2207/10012; G06T 2207/30164; G06T 2219/2004; G06T 7/75; G06T 7/0008; G06T 2207/20224; G06T 2207/20081; G06T 7/0002; H04N 13/271; H04N 5/23219; H04N 5/23229; H04N 5/23245; H04N 5/23293; H04N 5/23296; H04N 5/2354; H04N 7/18; H04N 7/181; G09G 5/00; B61L 23/042; A63F 2003/00223; A63F 3/00214; A63F 2009/2435; B33Y 50/00
  USPC ................ 348/143, 169; 345/419, 420, 421; 382/103, 152
  See application file for complete search history.

(56) References Cited

U.S. PATENT DOCUMENTS

| | | | |
|---|---|---|---|
| 8,306,265 B2* | 11/2012 | Fry | ........................ A61B 5/1113 |
| | | | 382/103 |
| 8,477,154 B2* | 7/2013 | Davis | ...................... G06T 19/00 |
| | | | 345/653 |
| 8,612,170 B2 | 12/2013 | Smith et al. | |
| 8,712,893 B1 | 4/2014 | Brandmaier et al. | |
| 9,218,626 B1 | 12/2015 | Haller, Jr. et al. | |
| 9,228,834 B2 | 1/2016 | Kidd et al. | |
| 9,500,545 B2 | 11/2016 | Smith et al. | |
| 9,824,453 B1* | 11/2017 | Collins | .................. G06Q 40/08 |
| 9,846,093 B2 | 12/2017 | Smith et al. | |
| 9,886,771 B1 | 2/2018 | Chen et al. | |
| 10,319,035 B2 | 6/2019 | Nelson et al. | |
| 10,319,094 B1 | 6/2019 | Chen et al. | |
| 10,373,260 B1 | 8/2019 | Haller, Jr. et al. | |
| 10,373,262 B1 | 8/2019 | Haller, Jr. et al. | |
| 10,380,696 B1* | 8/2019 | Haller, Jr. | ................. G06K 9/00 |
| 10,636,148 B1 | 4/2020 | Chen et al. | |
| 10,657,647 B1 | 5/2020 | Chen et al. | |
| 10,706,321 B1* | 7/2020 | Chen | ..................... G06T 3/4007 |
| 10,730,526 B2 | 8/2020 | Fredman | |
| 10,740,891 B1 | 8/2020 | Chen et al. | |
| 2004/0263624 A1* | 12/2004 | Nejikovsky | ........... B61L 23/044 |
| | | | 348/148 |
| 2008/0247635 A1* | 10/2008 | Davis | ..................... G06T 19/00 |
| | | | 382/152 |
| 2009/0254572 A1* | 10/2009 | Redlich | .................. G06Q 10/06 |
| 2010/0121482 A1* | 5/2010 | Jackson | ............... G06Q 10/087 |
| | | | 700/217 |
| 2010/0250497 A1* | 9/2010 | Redlich | ............... H04L 63/0227 |
| | | | 707/661 |
| 2014/0316825 A1 | 10/2014 | van Dijk et al. | |
| 2015/0254828 A1* | 9/2015 | Beach | ................... G06T 7/0004 |
| | | | 382/141 |
| 2017/0270612 A1* | 9/2017 | Howe | ................ G06Q 30/0278 |
| 2017/0270650 A1* | 9/2017 | Howe | ....................... G06T 7/62 |
| 2018/0182039 A1* | 6/2018 | Wang | .................. G06K 9/6268 |

OTHER PUBLICATIONS

Written Opinion of the International Searching Authority dated Nov. 10, 2017, issued in connection with International Application No. PCT/GB2017/052729 (5 pages).
Examination Report dated May 27, 2021, issued by the United Kingdom Intellectual Property Office in connection with United Kingdom Application No. GB1616078.0 (3 pages).
Examination Report dated Oct. 14, 2021, issued by the United Kingdom Intellectual Property Office in connection with United Kingdom Application No. GB1616078.0 (3 pages).
Office Action dated Sep. 26, 2023, issued by the Canadian Intellectual Property Office in connection with Canadian Patent Application No. 3,043,280 (3 pages).

* cited by examiner

AUTOMATIC IMAGE BASED OBJECT DAMAGE ASSESSMENT

RELATED APPLICATIONS

This application is a U.S. National Phase Application under 35 U.S.C. 371 of International Application No. PCT/GB2017/052729 filed Sep. 15, 2017, which claims the benefit of United Kingdom (Great Britain) Patent Application No. 1616078.0 filed on Sep. 21, 2016. The disclosures of these applications are incorporated herein by reference in their entireties.

The present invention relates to systems and methods for detecting/analysing/assessing damage to an object such as, for example, a vehicle and providing estimates on repair/replacement costs, as well as, an evaluation on potential image manipulation and fraud. In particular, the present invention relates to a fully automated method for detecting/analysing/assessing damage to an object from image data provided by a user.

INTRODUCTION

When insured property is damaged, the owner may file a claim with the insurance company. However, conventional processing of the insurance claim is a complex process including, inter alia, the involvement of experts such as accident assessors in order to inspect, analyse and assess any damage to the insured object and provide the amount of damage, as well as, costs required to repair or replace the damaged object. Thus, there is a heavy reliance on manual inspections by an expert to provide a repair cost estimate, which may come with significant cost and delay in processing time, as a person (assessor) must view the asset in order to assess the damage and decide upon an outcome, e.g. view a vehicle and decide if the vehicle is repairable or not.

Also, the consumer may want to know the full extent of the damage before involving the insurance or assessor in order to decide, whether it is worth submitting an insurance claim or more cost effective to simply pay the cost of repair themselves. For instance, is the damage panel repairable or does it need a replacement.

There has been some advancement across the industry over the last 5 to 10 years in the use of images to assist with assessing vehicles or other property without the need of a physical inspection. However, these advancements still rely on the technical expertise required to first capture suitable images (e.g. required technical standard format) and then incorporate the images with additional data from third parties, to allow a trained assessor or engineer to manually inspect the images and generate, for example, a repair estimate report. This is a costly, time consuming process particularly when there are finite technical resources.

Other available systems may allow a consumer to capture the images in accordance with strict instructions and process the initial claim by providing detailed information of the damage (e.g. following a protocol of questions to determine the location, type and description of the damage), making the process very time consuming and very subjective to the consumer's incentive.

Accordingly, it is an object of the present invention to provide a fully automatic method adapted to assess damage to an object from any image data provided by a user and without the need of further user input.

SUMMARY OF THE INVENTION

Preferred embodiment(s) of the invention seek to overcome one or more of the above disadvantages of the prior art.

According to a first aspect of the present invention there is provided a computer-based method for automatically evaluating validity and extent of a damaged object from image data, comprising the steps of:
(a) receive image data comprising one or more images of at least one damaged object;
(b) detect image alteration in any one of said one or more images utilising an image alteration detection algorithm, and remove any altered images from said one or more images;
(c) detect and classify said at least one damaged object in any one of said one or more images, utilising at least one first machine learning algorithm;
(d) detect at least one damaged area of said classified damaged object, utilising at least one second machine learning algorithm;
(e) classify, quantitatively and/or qualitatively, an extent of damage of said at least one damaged area, utilising at least one third machine learning algorithm, and characteristic information of said damaged object and/or an undamaged object that is at least equivalent to said at least one damaged object;
(f) provide a visual marker to said detected at least one damaged area in any one of said at least one or more images;
(g) generate a predictive analysis to repair and/or replace said at least one damaged object, utilising a fourth machine learning algorithm and said classified extent of damage of the detected said at least one damaged area.

By using machine learning algorithms, such as, for example, multiple Computer Vision, Artificial Intelligence, Deep Learning and proprietary algorithms, the method of the present invention enables the use of less technical images (i.e. technical standard) allowing users unskilled in the field of damage assessment to capture the image data (still images, video) and perform an automated assessment of the damage and generate a prediction report on associated implications of this damage, e.g. a vehicle being a total loss compared to the cost of the repair, a vehicle needs new replacement parts or a vehicle can be repaired at estimated costs.

Also, the use of non-technical images combined with a fully automated assessment method enables a system (e.g. computer system, a mobile device) to provide results in a relatively short time compared to time required by an assessor to either inspect an asset physically, or assess suitable technical images to provide an estimate report. Therefore, automating this process significantly removes the need for human input further improving the business process throughout the insurance claim lifecycle and, consequently, significantly improving the time it takes to settle a policyholder's claim (which is beneficial for the policyholder, as well as, the insurer).

In addition, the method of the present invention provides the advantage that, due to the nature of the algorithms at the core of the system, the system can be easily re-trained to perform automated damage analysis and fraud detection for any other industry.

Preferably, step (b) may further include accessing information related to said object from at least one database to detect fraudulent activities. Even more preferably, the assessment in step (b) may include extracting key information from the image data and/or accessing information related to said object from at least one external or internal database, wherein the information extracted from the image and databases may be utilised separately or in combination to detect fraudulent activities.

Advantageously, the characteristic information of said damaged object and/or an undamaged object may be provided from any one or any combination of a computer-based data storage, an external data storage and an external server via a communication network. This provides the advantage that up-to-date information of the damaged object (e.g. specific vehicle type, vehicle parts etc.) is available to generate an accurate assessment and prediction analysis. The information may be provided via internal or external data storage (e.g. pre-installed database, a CD, USB or any other external data storage provided by a professional body including up-to-date info). Also, required information may be provided online via the Internet, a mobile network or any other communication network.

Preferably, step (d) may further include generating image location information for each one of said at least one damaged area. Advantageously, the image location information may comprise the location of said damaged area with respect to said classified damaged object.

Advantageously, said at least one first, second, third and fourth machine learning algorithm may include any one or any combination of Deep Learning algorithms, artificial neural networks, statistical modelling, Computer Vision algorithms. This provides the advantage of an intelligent and highly adaptable system/method capable of automatic object/damage recognition/interpretation/classification.

Advantageously, the visual marker may comprise any one or any combination of shading, encircling, highlighting and color-coded mapping.

Preferably, the predictive analysis may comprise any one or any combination of:
- a prediction on the reparability of said at least one damaged object;
- a prediction on the time to repair said at least one damaged object;
- a prediction on the costs to repair said at least one damaged object;
- a list of detected said at least one damaged area and associated parts of said at least one damaged object;
- qualitative assessment of damage detected on said at least one damaged object;
- a prediction on association of detected damaged areas to a single [historical] event;
- a prediction on image alteration, and
- a prediction of likelihood of fraud.

According to a second aspect of the present invention, there is provided a computer-readable storage medium comprising computer-executable program instructions stored thereon that when executed by a computer processor perform a method according to the first aspect of the present invention.

According to a third aspect of the present invention, there is provided a computer system comprising computer-executable program instructions implemented thereon that when executed by a computer processor perform a method according to the first aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiment of this invention will be described in relation to intelligent vehicle inspection (IVI) generating, inter alia, repair cost estimate for damaged vehicles from vehicle image data provided by a consumer (i.e. non-expert in the field of damage assessment). However, it should be appreciated that the present invention will work equally well with image data of any other object.

The described Intelligent Vehicle Inspection (IVI) is an automated method for processing images (e.g. still images or video images) to automatically provide specific information, such as, (i) a triage result (e.g. a car is repairable or a total loss), (ii) detection of potentially suspicious (i.e. manipulated) images, (iii) detection of potential fraud utilising specific information extracted from the image data and/or received from suitable databases (i.e. Industry Fraud Databases, such as, but not limited to, the Insurance Fraud Register, the Motor Insurance Database, the DVLA, vehicle register or VIN check to check the history of a vehicle), and other useful information, such as, (vi) repair time, (v) required parts, (vi) cost to repair/replace parts. With the IVI, the images may be processed at any stage during the insurance claim lifecycle and may be used across varying product lines, such as, for example, First Notification of Loss (FNOL) for vehicles, homes etc.

In particular, IVI utilises a suite of algorithms that are tailored to automatically detect predetermined features from images (still images or video images), and quantify the features in an automated manner.

Figure 1:
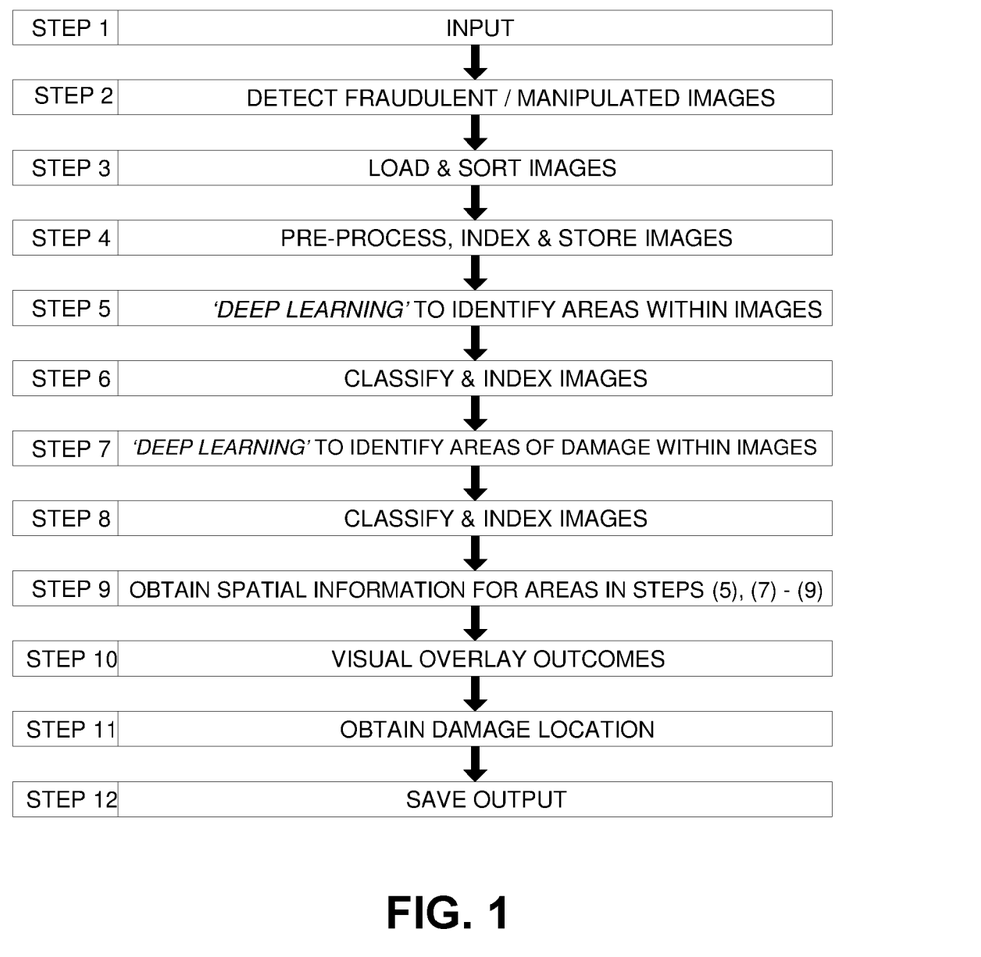
FIG. 1 shows an example step-by-step flow chart for initial image alteration detection and damage detection on an object, e.g. vehicle.
Figure 2:
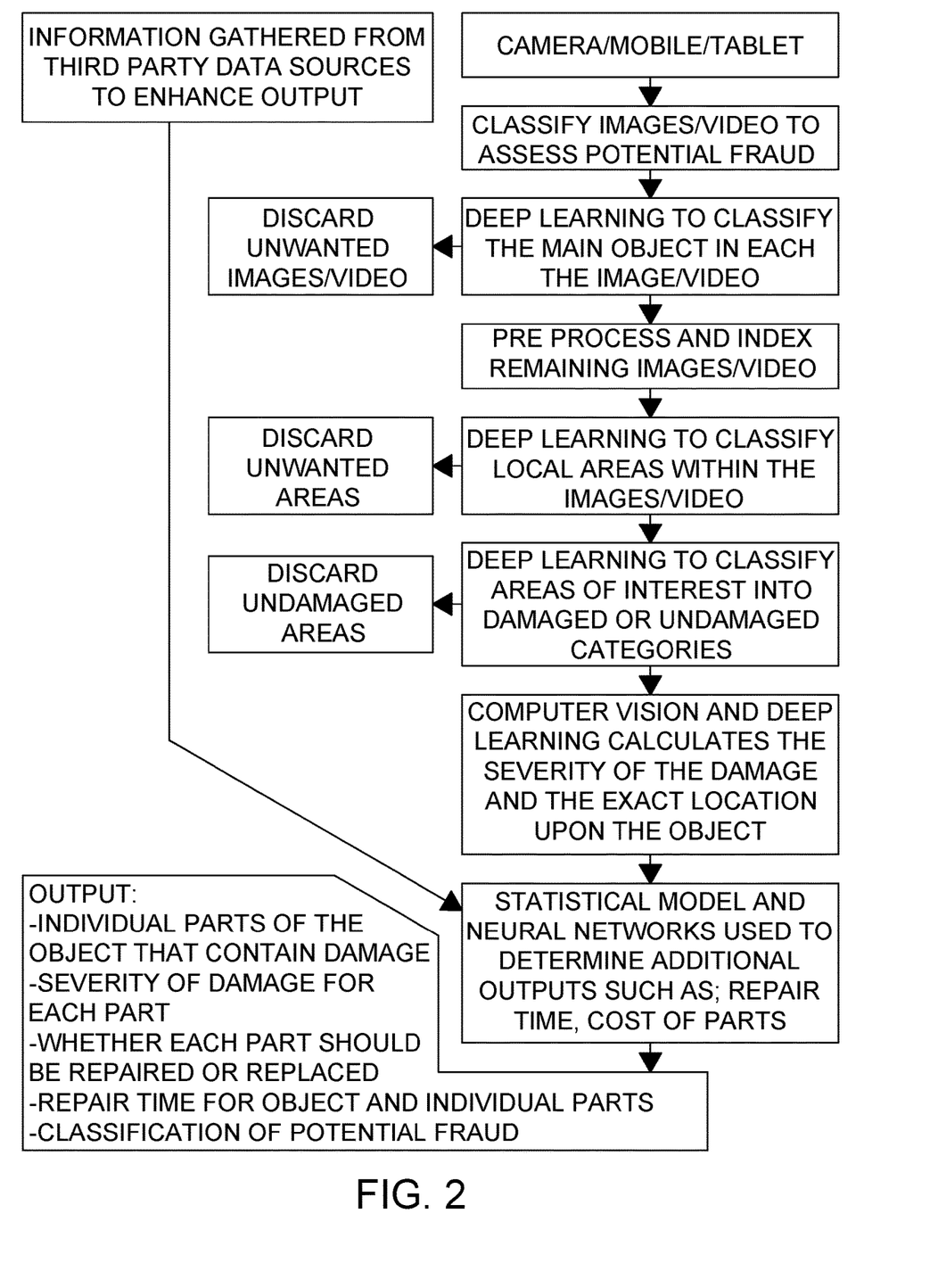
FIG. 2 shows high-level flow chart of the method of the present invention as executed by, for example, a computer system.
Figure 3:
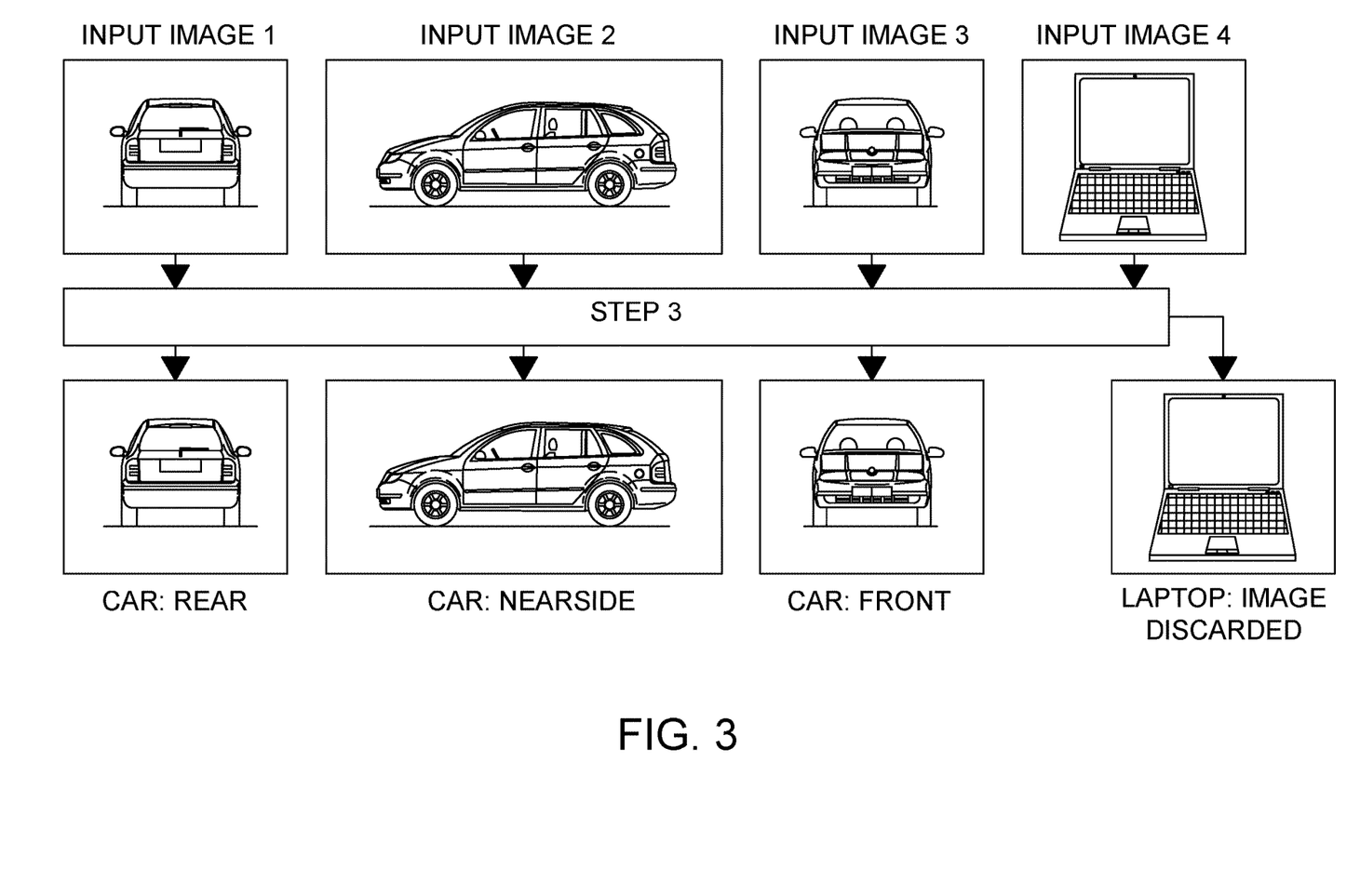
FIG. 3 shows an illustrated example of Step 3 in FIG. 1, comprising image input, image view classification and image manipulation detection.
Figure 4:
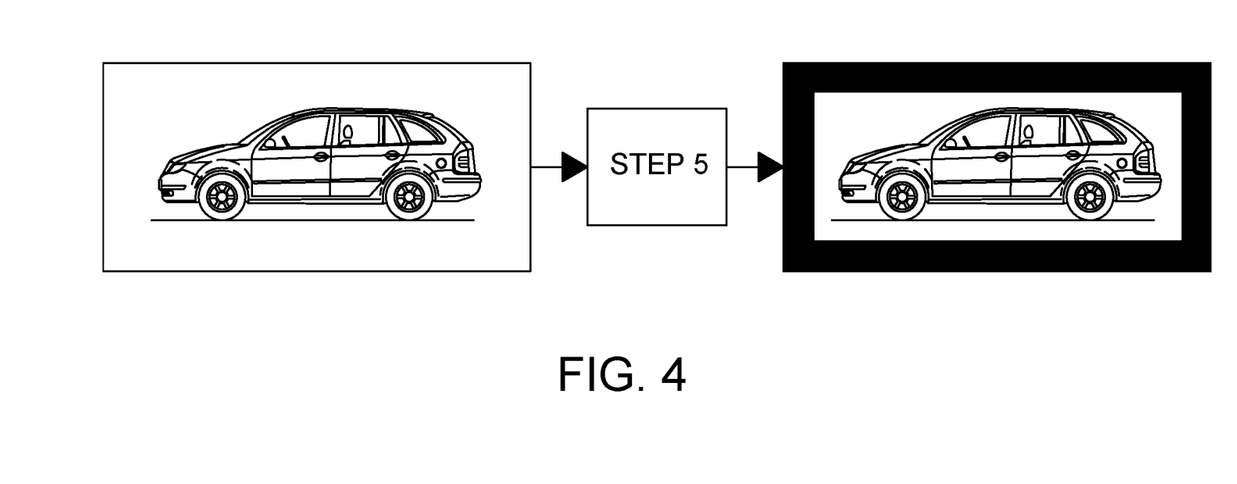
FIG. 4 shows an illustrated example of Step 5 in FIG. 1, wherein areas within the image(s) are identified/classified (e.g. car, house, glass)

Referring now to FIG. 1, simplified steps of a generic damage detection flow is shown, including the steps of "data input" (step 1), "detection of fraudulent or manipulated images" (step 2), "loading & sorting the suitable images" (step 3), "pre-processing the images" (step 4) (e.g. indexing the images), "identify areas within image" (step 5) (e.g. specific parts of a car), "classify & index identified areas" (step 6), "identify areas of damage" (step 7), "classify & index the identified damaged areas" (step 8) (e.g. front fender is bent), "obtain spatial information for the areas identified in steps (5) to (7)" (step 9) (e.g. specific location of the front fender with respect to the identified object, e.g. car), "overlay the results" (step 10) (e.g. visually mark the damaged areas within image), "obtain location of identified damage" (step 11), and "save the results" (step 12).

In summary, the key features of the system of the present invention (i.e. IVI) are:

Fraud detection from image data;

Damage detection within image data;

Damaged areas location within image data;

Providing a list of damaged parts of the object (if available);

Providing an estimate for potential repair time based on automated decision making;

Providing potential repair costs or costs for replacing relevant parts;

Visually marking any damaged area on respective image data;

In more detail, IVI's damage detection may provide triage information on whether a vehicle is a total loss, or repairable. In case the triage result deems the vehicle repairable, IVI may provide information on (i) the amount of time a repair is likely to take, (ii) a list of the parts that are damaged and either need to be repaired or replaced and a detailed breakdown of the costs associated with the repair or replacement of the damaged parts.

In the event the triage result deems the vehicle to be a total loss, IVI may provide information and categorisation relating to the extent of the damage incurred and, whether or not, the vehicle is suitable for potentially being put back on the road. In particular, IVI may generate information on, whether the identified damage is structural, non-structural or a complete/severe all-round damage, the extent of damage that is detected (e.g. scratch, dent etc.), and any indication of potential fraudulent activity. To detect fraudulent activity various factors may be utilised, such as, for example:

- An automated number plate and VIN (vehicle identification number) reading, as well as, comparing the data against various industry databases.
- Utilising suitable imaging processing techniques to automatically detect any image manipulation, for example, the image originator has attempted to modify/manipulate any images.
- Checking the images EXIF (Exchange Image File Format) data matches the expected criteria (i.e. camera information, geolocation (i.e. GPS data) or other suitable metadata).

IVI may also provide information on, whether pre-accident damage has been detected, which may affect the vehicles value (wear and tear, paint fade etc.). Also, IVI may visually mark the damaged areas by simply placing a line box around the damage. In addition, specific panels may be extracted or colour highlighted to prompt closer inspection by a specialist or the mechanic when ordering the new parts.

It is understood that the present invention is suitable for use with any image data captured by any suitable source, such as, film cameras and digital cameras, but also any other camera, such as, for example found on smart phones, tablets or mobile computers. Furthermore, the present invention is capable of automatically processing images captured by user of any technical and/or photographing skill, i.e. from unskilled general public to specialists, such as, vehicle recovery operators, police officers, vehicle repairers, salvage agents or loss adjusters.

Consequently, by allowing the use of any non-standardised view of the damaged object to automatically assess and process the damaged object, suitable results can be provided within seconds, rather than the hours or days it takes to have a specialist (e.g. trained assessor) to physically inspect and assess the damage to provide a damage report. Also, IVI significantly removes the need for human intervention, therefore, improving the business process throughout the life cycle of the insurance claim and consequently reducing the time to settle the policyholder's claim (which is preferred by the insurer and the policyholder).

Referring now to FIGS. 2 to 6, the technical process of the invention is described using a damaged car as example. As mentioned previously, images (still or video) may be captured by a user of any skill set. The user then provides the image to the computer system of the invention (e.g. uploading the images onto a computer device capable of executing the method of the present invention, either directly or via an online service), where the images are passed through a collection of algorithms to classify, whether or not, any of the images have been manipulated (using EXIF data) and, whether or not, the claim is fraudulent (i.e. by checking the vehicles insurance claim history). In particular, the image is passed through a classification algorithm to determine that the image(s) is of the expected format and content. I.e. the input image is first passed through a convolutional neural network to determine the main component (object) is what is expected, e.g. a car, a laptop or a house. Then, the image view angle and perspective is classified utilising a collection of different convolutional neural networks. In case a set of a plurality of images is provided, the image(s) with the most suitable viewing angles is (are) selected to provide the system with a maximum of information of the object(s). After pre-processing, the image(s) are then indexed and stored.

Then, a machine learning algorithm such as a convolutional neural network is used to determine a confidence rating on whether identified areas of the processed image contain parts of the expected item (e.g. car, glass, house etc.). This aids the filtering of background objects which are usually found within an image (see FIG. 4).

In the next step (see FIG. 5), the locus is determined within the image of the detected element, so as to pinpoint where on any images they can be found. The images are then passed through another set of machine learning algorithms, such as, for example, convolutional neural networks, which determine the variance from an ideal state. Using the example of a car, a classifier would look for any dents, scratches and other unexpected variances to an undamaged car, and determine the likelihood that a variance is present.

Figure 5:
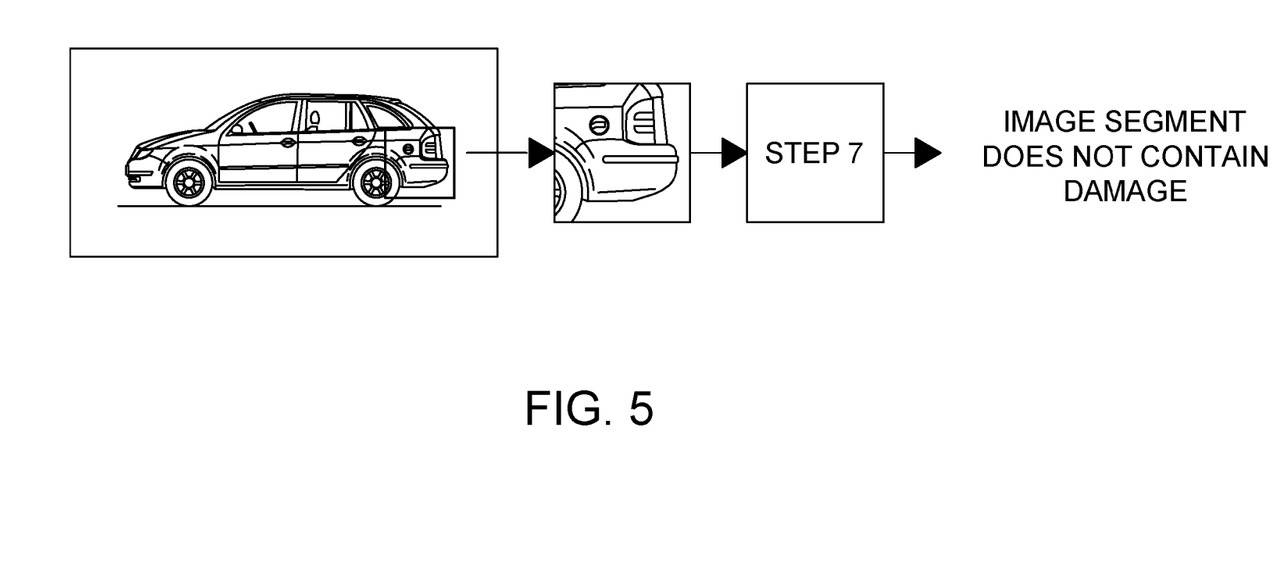
FIG. 5 shows an illustrated example of Step 7 in FIG. 1, wherein damaged areas within the classified image(s) are identified (e.g. damage on rear fender) and segmented.

Those elements of the classified object that are containing any damage are then passed through a separate collection of machine learning algorithms, e.g. convolutional neural networks, which assess the severity and/or nature of the damage.

Figure 6:
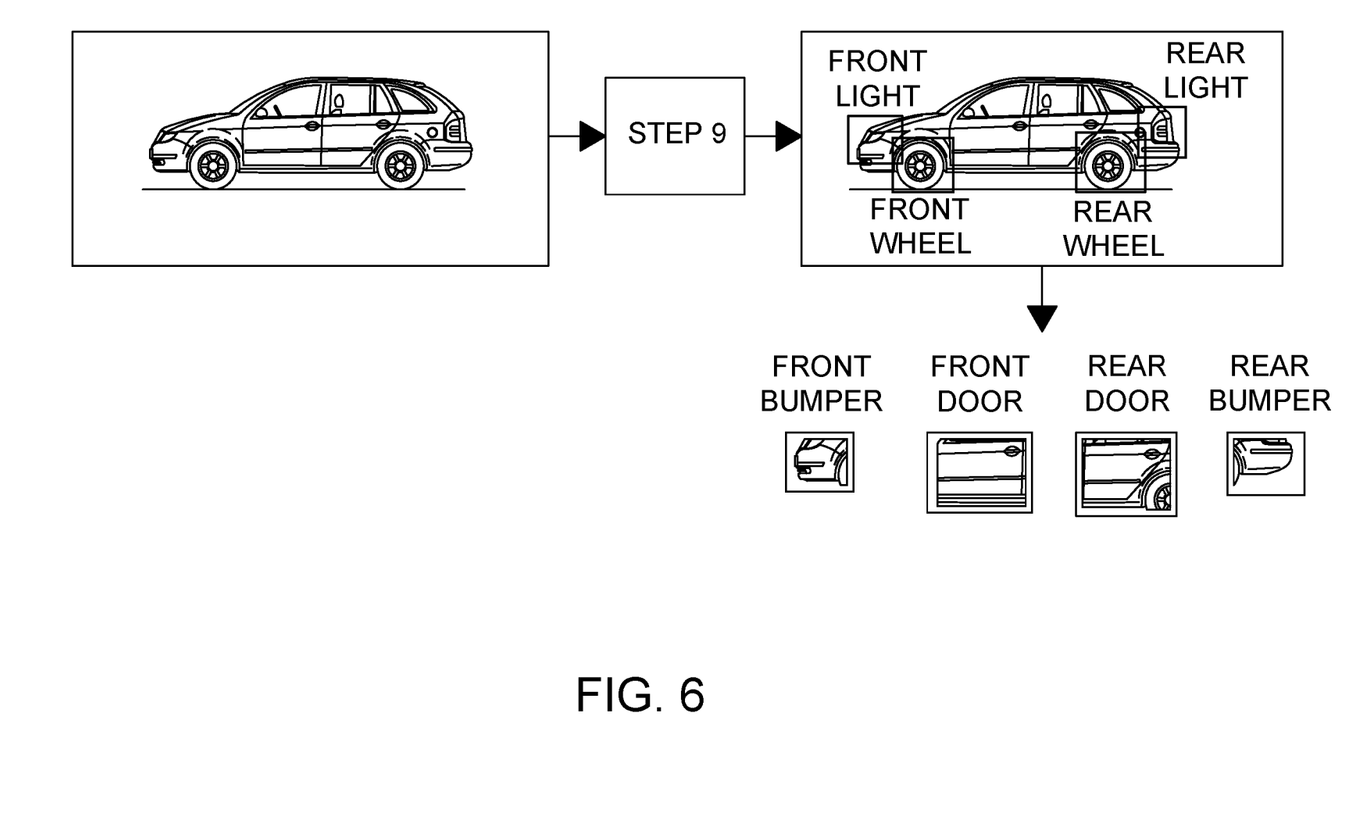
FIG. 6 shows an illustrated example of Step 9 in FIG. 1, wherein spatial information is obtained from the image(s) (e.g. damage location relative to local areas such as lights or wheels of a vehicle)

As shown in FIG. 6, X and Y coordinates of all detected variances which are classified as damage are correlated and indexed for each image. A collection of algorithms is then used to find special contextual information on the relative location of the damage within the classified object, i.e. car, house, window.

A collection of computer vision classifiers such as, but not limited to, HOG (Histogram of Orientated Gradients) and SURF (Speeded Up Robust Feature) are then utilised to detect local areas within the image. In this specific example of a vehicle, local areas would be such things as lights, wheels and Vehicle Registration Mark (VRM). Using the detected areas and the previously detected angle or perspective of the vehicle, the damage location is estimated relative to its position within the vehicle.

The identified locations any damage is stored allowing the user to later visually mark the damages in various formats. For example, the detected damages (i.e. variances) may be visually marked using heat maps, shading on the images or encircling, or any other visual form of highlighting the damaged areas within the image.

The data output generated by the various algorithms is then passed to the system to generated a complete report on the damages, cost of repair and/or replacement, as well as, any fraudulent activities.

Example of Machine Learning Algorithms for Specific Image Processing:

(a) Object Localisation:

Object localisation is used for multiple purposes, such as, determining the location of a certain object within an image, and also to determine a damage (variance) within that certain object. One useful method to obtain object localisation is to use a "sliding window" technique. A "sliding window" is obtained by creating small overlapping subsections of an image and classifying each one separately. In the event a sub-section is classified to contain an object, the corresponding area within that image is then classified as containing that object. This results in localised areas within the original image that are classified as either containing or not containing an object.

Convolutional Neural Networks may also be utilised in a number of ways to perform object localisation without the use of a sliding window. These methods include, but are not limited to, (i) the "Fast Region-based Convolutional Network method" (Fast R-CNN) as described, for example, by Ross Girshick in "Fast R-CNN", (ii) the "Unified, Real-Time Object Detection" (YOLO), as described by Joseph Redmon et al. in "You Only Look Once: Unified Real Time Object Detection" and (iii) "Saliency Maps" as described in "Deep Inside Convolutional Networks: Visualising Image Classification Models and Saliency maps" by Karen Simonyan et al. Both the (i) and (ii) output bounding box predictions with confidence percentages for each bounding box containing objects upon which the networks have been trained to recognize. Saliency maps (iii) perform object localisation estimations per pixel using back-propagation on a single classified image by applying a convolutional network architecture suitable for single image classification.

(b) Convolutional Neural Networks:

The aim of a convolutional neural network for image classification is to be able to take raw pixel data as an input and return a correct classification for the main content within the image. A simple example is described with reference to FIG. 7.

Figure 7:
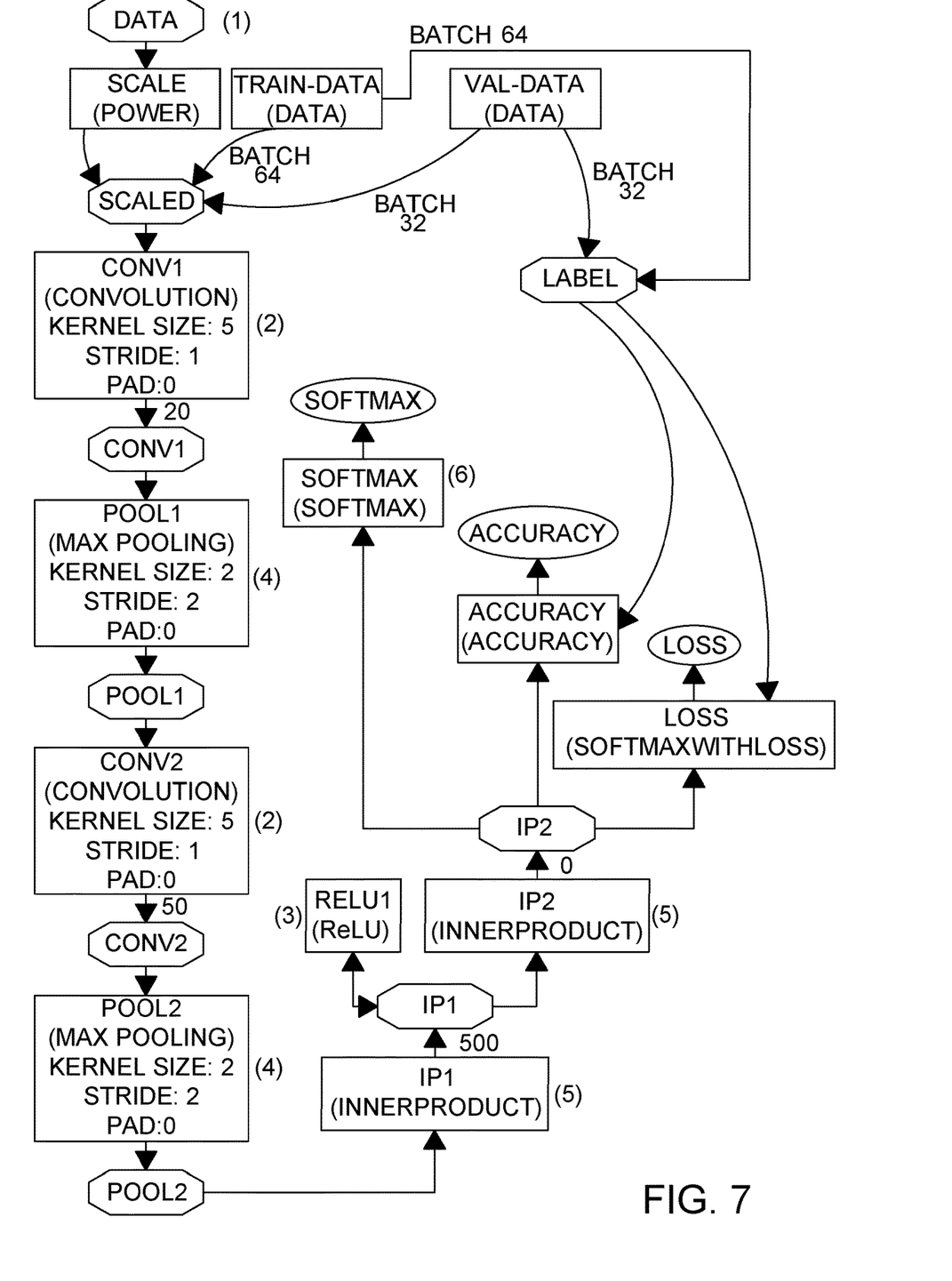
FIG. 7 shows an example architecture of an algorithm of a Convolutional Neural Network.

Input Data (1):

For image classification the input data will be an image usually of a predetermined size and in either grayscale or RGB colour space.

Convolutional Layer (2):

A convolutional layer computes the output of neurons connected to local regions in the input, each computes a dot product between their weights and the small region they are connected to. Each convolutional layer usually contains a number of these 'convolutional filters' producing multiple activations per image.

Activation Function (3):

Usually either a ReLu (Rectified Linear unit) or Sigmoid function will be used as an activation function within a convolutional network.

Pooling Layer (4):

A pooling layer down-samples the dimensions of the data (i.e. width, height).

Fully Connected Layer (FC) (5):

An FC layer is a layer of fully connected neurons as would be found in a conventional neural network.

Softmax Function (6):

A softmax function (or normalised exponential) takes an input vector (usually the last FC layer of the network) and returns a vector of length equal to that of the training classes with an element x for each class within the range $0 \leq x \leq 1$ and such that $\Sigma_{i=1}^{i=n} x_n = 1$, i.e. a probability value for each class.

These layers and functions form the building blocks of a convolutional network and can be combined in many different configurations and with many different parameter values.

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A computer-based method for automatically evaluating validity and extent of at least one damaged object from image data, comprising the steps of:
   (a) receiving image data comprising one or more images of at least one damaged object;
   (b) inspecting any one of said one or more images for fraudulent manipulation of said one or more images utilising an image alteration detection algorithm that classifies at least one of a view angle or a perspective of said one or more images, and removing any image comprising fraudulent manipulation from said one or more images;
   (c) identifying and classifying said at least one damaged object in any one of said one or more images, utilising at least one first machine learning algorithm;
   (d) detecting at least one damaged area of said classified damaged object, utilising at least one second machine learning algorithm;
   (e) classifying, quantitatively and/or qualitatively, an extent of damage of said at least one damaged area, utilising at least one third machine learning algorithm, and characteristic information of said damaged object and/or an undamaged object that is at least equivalent to said at least one damaged object;
   (f) providing a visual marker to said detected at least one damaged area in any one of said at least one or more images; and
   (g) generating a predictive analysis to repair and/or replace said at least one damaged object, utilising a fourth machine learning algorithm and said classified extent of damage of the detected said at least one damaged area.

2. A computer-based method according to claim 1, wherein step (b) further includes accessing information related to said object from at least one database to detect fraudulent activities.

3. A computer-based method according to claim 2, wherein the assessment includes extracting key information from the image data and/or accessing information related to said object from at least one external or internal database, wherein the information extracted from the image and databases is utilised separately or in combination to detect fraudulent activities.

4. A computer-based method according to claim 3, wherein said key information comprises GPS data received from the image data.

5. A computer-based method according to claim 1, wherein said characteristic information of said damaged object and/or an undamaged object is provided from any one or any combination of a computer-based data storage, an external data storage and an external server via a communication network.

6. A computer-based method according to claim 1, wherein step (d) further includes generating image location information for each one of said at least one damaged area.

7. A computer-based method according to claim 6, wherein said image location information comprises the location of said damaged area with respect to said classified damaged object.

8. A computer-based method according to claim 1, wherein said at least one first, second, third and fourth machine learning algorithm includes any one or any combination of Deep Learning algorithms, artificial neural networks, statistical modelling, Computer Vision algorithms.

9. A computer-based method according to claim 1, wherein said visual marker comprises any one or any combination of shading, encircling, highlighting and color-coded mapping.

10. A computer-based method according to claim 1, wherein said predictive analysis comprises any one or any combination of:
   a prediction on the reparability of said at least one damaged object;
   a prediction on the time to repair said at least one damaged object;
   a prediction on the costs to repair said at least one damaged object;
   a list of detected said at least one damaged area and associated parts of said at least one damaged object;
   qualitative assessment of damage detected on said at least one damaged object;
   a prediction on association of detected damaged areas to a single event;
   a prediction on image alteration, and
   a prediction of the likelihood of fraud.

11. A non-transitory computer-readable storage medium comprising computer-executable program instructions stored thereon that when executed by a computer processor perform a method according to claim 10.

12. A computer system comprising computer-executable program instructions implemented thereon that when executed by a computer processor perform a method according to claim 10.

* * * * *